(12) United States Patent
Mech

(10) Patent No.: US 7,227,555 B2
(45) Date of Patent: *Jun. 5, 2007

(54) RENDERING VOLUMETRIC FOG AND OTHER GASEOUS PHENOMENA

(75) Inventor: Radomir Mech, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/275,583

(22) Filed: Jan. 17, 2006

(65) Prior Publication Data

US 2006/0092175 A1    May 4, 2006

Related U.S. Application Data

(63) Continuation of application No. 09/990,085, filed on Nov. 21, 2001, now Pat. No. 7,046,243.

(60) Provisional application No. 60/252,094, filed on Nov. 21, 2000.

(51) Int. Cl.
  *G09G 5/00*    (2006.01)
(52) U.S. Cl. ............. 345/606; 345/419; 345/422; 345/426; 345/582; 345/589; 345/610
(58) Field of Classification Search ........ 345/419, 345/426, 582, 589, 422, 606, 610
  See application file for complete search history.

(56) References Cited

U.S. PATENT DOCUMENTS

| | | | |
|---|---|---|---|
| 5,268,996 A | 12/1993 | Steiner et al. | |
| 5,339,386 A | 8/1994 | Sodenberg et al. | |
| 5,357,579 A | 10/1994 | Buchner et al. | |
| 5,412,773 A | 5/1995 | Carlucci et al. | |
| 5,706,481 A | 1/1998 | Hannah et al. | |
| 6,078,332 A | 6/2000 | Ohazama | |
| 6,184,857 B1 | 2/2001 | Latham | |
| 6,268,861 B1 | 7/2001 | Sanz-Pastor et al. | |
| 6,330,000 B1 | 12/2001 | Fenney et al. | |
| 6,417,862 B1 | 7/2002 | Brothers et al. | |
| 6,437,781 B1 | 8/2002 | Tucker et al. | |
| 6,529,193 B1 | 3/2003 | Herken et al. | |
| 6,545,685 B1 | 4/2003 | Dorbie | |
| 6,580,430 B1 | 6/2003 | Hollis et al. | |
| 6,762,760 B2 | 7/2004 | Deering | |
| 2001/0030648 A1 | 10/2001 | Deering | |

OTHER PUBLICATIONS

Goodman: "Introduction to Fourier Optics Spatial Filtering and Optical Information Processing"; 1968; Library of Congress Catalog Card No. 68-17184; pp. 149-154.
Legakis, "Fast Multi-Layer Fog," Computer Graphics Annual Conference Series, 1998, 3 pages.
Heldrich, et al., "Applications of Pixel Textures in Visualization and Realistic Image Synthesis," 1999 Symposium on Interactive 3D Graphics, Atlanta, GA USA, pp. 127-134.
Ikedo et al."The Truga001, A Scalable Rendering Processor", IEEE, 1998, pp. 59-79.

*Primary Examiner*—Kimbinh T. Nguyen

(57) ABSTRACT

Systems for rendering a gaseous display. The distance from a user's reference point to each pixel through the gas is determined. The distance is then converted into an attenuation factor that is used to blend the scene color with the gas color. The result can then be used to simulate patchy fog, clouds, or other gases of more or less constant density and colors.

15 Claims, 14 Drawing Sheets

Linear Fog Equation

Equation One (1)

Attenuation Factor(f) = $\dfrac{\text{Maximum Distance} - \text{Pixel Distance}}{\text{Maximum Distance} - \text{Minimum Distance}}$ Equation Two (2)

Color = f • Object Color + (1-f) • Fog Color

Equation Three (3)

Color = $\dfrac{\text{Pixel Distance} - \text{Minimum Distance}}{\text{Maximum Distance} - \text{Minimum Distance}}$ • Fog Scale Final Fogged Color Equation Unfogged pixel color • fog factor + fog color • (1 - fog factor)

RENDERING VOLUMETRIC FOG AND OTHER GASEOUS PHENOMENA

CROSS-REFERENCE TO RELATED APPLICATIONS

The present application is a continuation of and claims priority to U.S. patent application Ser. No. 09/990,085 filed Nov. 21, 2001, now issued as U.S. Pat. No. 7,046,243, which, in turn, claims priority to U.S. Provisional Application No. 60/252,094, filed Nov. 21, 2000, the disclosures of which are incorporated by reference herein.

This patent application is related to the following four co-pending and commonly-owned applications:

1. R. Mech, et al., "Rendering Volumetric Fog and Other Gaseous Phenomena" (MS1-1031US), U.S. patent application Ser. No. 09/990,085, now issued as U.S. Pat. No. 7,046,243;

2. R. Mech, et al., "Rendering Volumetric Fog and Other Gaseous Phenomena" (MS1-1031USC2), U.S. patent application Ser. No. 11/275,582, filed concurrently herewith (incorporated in its entirety herein by reference);

3. R. Mech, et al., "Rendering Volumetric Fog and Other Gaseous Phenomena Using an Alpha Channel" (MS1-1032US), now U.S. Pat. No. 6,940,504 (incorporated in its entirety herein by reference); and 4. R. Mech, "Method, System, and Computer Program Product for Rendering Multicolored Layered Fog with Self-Shadowing and Scene Shadowing" (MS1-1033US), U.S. Patet application Ser. No. 09/990,082, now abandoned (incorporated in its entirety herein by reference). aircraft cockpit. Several key techniques used to achieve visual realism include antialiasing, blending, polygon offset, lighting, texturizing, and atmospheric effects. Atmospheric effects such as fog, smoke, smog, and other gaseous phenomena are particularly useful because they create the effect of objects appearing and fading at a distance. This effect is what one would expect as a result of movement. Gaseous phenomena are especially important in flight simulation applications because they help to train pilots to operate in and respond to conditions of limited visibility.

Quite a few methods for creating realistic images of fog, clouds and other gaseous phenomena have been developed in the past. Most of these techniques focus on computing the light distribution through the gas and present various methods of simulating the light scattering from the particles of the gas. Some resolve multiple scattering of light in the gas and others consider only first order scattering (the scattering of light in the view direction) and approximate the higher order scattering by an ambient light. A majority of the techniques use ray-tracing, voxel-traversal, or other time-consuming algorithms to render the images. Taking advantage of the current graphics hardware some of the techniques are approaching interactive frame rates.

Another approach renders clouds and light shafts by blending a set of billboards, representing metaballs. The rendering times range from 10 to 30 seconds for relatively small images. Another approach renders gases by blending slices of the volume in the view direction. Using 3D textures, a near real-time frame rate is achieved. This is especially true for smaller images. Unfortunately, both these techniques are fill-limited, i.e., the number and the size of the rendered semi-transparent polygons is limited by the number of pixels hardware can render per second. Even on the fastest machines, it is not possible to render too many full-screen polygons per frame. The techniques may be suitable for rendering smaller local objects, e.g., a smoke column or a cloud, but even then the performance can suffer when the viewer comes too close to the object and the semitransparent polygons fill the whole screen. In the case of a patchy fog that can be spread across a large part of the scene, the number of slices would be simply too large.

In real-time animations, smoke and clouds are usually simulated by mapping transparent textures on a polygonal object that approximates the boundary of the gas. Although the texture may simulate different densities of the gas inside the 3D boundary and compute even the light scattering inside the gas, it does not change, when viewed from different directions, and it does not allow movement through the gas without sharp transitions. Consequently, these techniques are suitable for rendering very dense gases or gasses viewed from a distance. Other methods simplify their task by assuming constant density of the gas at a given elevation, thereby making it possible to use 3D textures to render the gas in real time. The assumption, however, prevents using the algorithm to render patchy fog. What is needed is a way to render in real-time, complex scenes that include patchy fog and other gaseous phenomena such that efficiency and high quality visual realism are achieved.

SUMMARY

A system, method, and computer program product for rendering a realistic displays of a gaseous phenomenon in a scene. In one implementation, the distance from a user reference point to each pixel traveled through the gas is determined by subtracting the distances to the front faces of the gas boundary from the distances to the back faces of the gas boundary. The travel distance is then converted into an attenuation factor which is used to blend the scene color with the gas color. The result can then be used to simulate patchy fog, clouds, or other gases of more or less constant density and color.

DETAILED DESCRIPTION

As used herein:

"Image" or "scene" means an array of data values. A typical image might have red, green, blue, and/or alpha pixel data, or other types of pixel data information as known to a person skilled in the relevant art.

"Pixel" means a data structure used to represent a picture element. Any type of pixel format can be used.

"Real-time" refers to a rate at which successive display images can be redrawn without undue delay upon a user or application. This interactive rate can include, but is not limited to, a rate equal to or less than approximately 120 frames per second. In one implementation, an interactive rate is equal to or less than 60 frames per second. In some examples, real time can be one frame update per second or faster.

"Depth" and "Distance" are interchangeable terms representing a value which is a function of distance between two points.

"Fog object" refers to a bounded volumetric gas.

"Travel distance value" refers to the distance traveled from a reference point to a pixel in a scene.

The boundaries of fog can be defined by polygonal surfaces to create so called "fog objects." It is possible to determine the travel distance through the fog objects by adding the "depths" of the fog objects in front of the rendered pixel.

In this discussion, the term "depth" of a fog object refers to distance information through the fog object. In one example, this distance information is equal to the distance within the fog object along a ray between a reference point and a pixel. If the fog object is closed and the pixel is outside the fog object, its depth can be computed by subtracting the distances to all back faces covering the given pixel from the distances to all front face covering the pixel. This has to be done for all fog objects in front of the pixel. If the pixel is inside a fog object, the distance to the pixel is used instead of the distance to the back face.

In an exemplary implementation, the fog object distance information is converted to a color component (r,g,b) to take advantage of the blending capabilities of the graphics hardware. For this purpose linear fog (converting distance to color) is used. It is noted that the actual distance from the viewpoint is not being measured, but instead measurements are taken from a plane located in the viewpoint.

Figure 1:
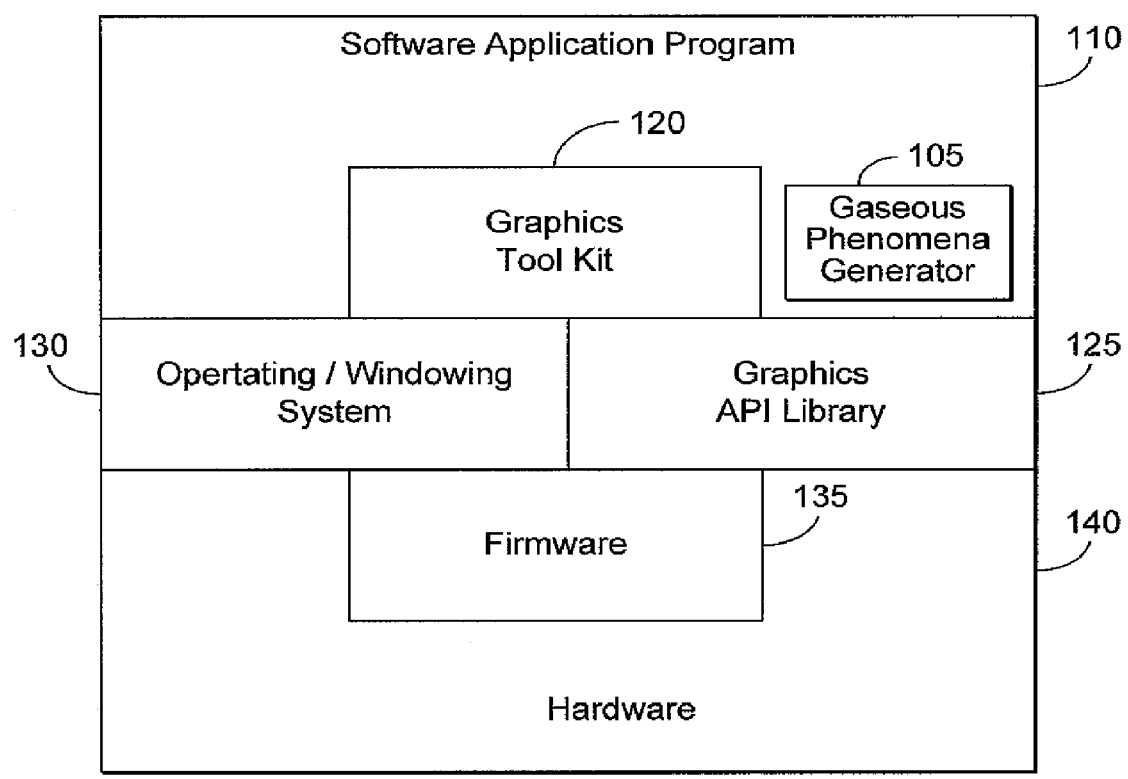
FIG. 1 is a block diagram illustrating an exemplary computer architecture.

FIG. 1 illustrates a block diagram of an example computer architecture 100, which may be implemented in many different ways, in many environments, and on many different computers or computer systems. Architecture 100 includes six overlapping layers. Layer 110 represents a high level software application program. Example software application programs include visual simulation applications, computer games or any other application that could take advantage of computer generated graphics. Layer 120 represents a three-dimensional (3D) graphics software tool kit, such as OPENGL PERFORMER, available from SGI, Mountain View, Calif. Layer 125 represents a graphics application program interface (API), which can include but is not limited to OPENGL, available from SGI. Layer 130 represents system support such as operating system and/or windowing system support. Examples of such support systems include UNIX, Windows, and LINUX. Layer 135 represents firmware which can include proprietary computer code. Finally, layer 140 represents hardware, including graphics hardware. Hardware can be any hardware or graphics hardware including, but not limited to, a computer graphics processor (single chip or multiple chip), a specially designed computer an interactive graphics machine, a gaming platform, a low end game system, a game console, a network architecture, a server, et cetera. Some or all of the layers 110–140 of architecture 100 will be available in most commercially available computers.

In one exemplary implementation, a gaseous phenomena generator module 105 is provided. The gaseous phenomena generator module 105 provides control steps necessary to carry out routine 400 (described in detail below). The gaseous phenomena generator module 105 can be implemented in software, firmware, hardware, or in any combination thereof. As shown in FIG. 1, in one example implementation, gaseous phenomena generator module 105 is control logic (e.g., software) that is part of application layer 110 and provides control steps necessary to carry out routine 400. In alternative implementations, gaseous phenomena generator 105 can be implemented as control logic in any one of the layers 110–140 of architecture 100, or in any combination of layers 110–140 of architecture 100.

Figure 2:
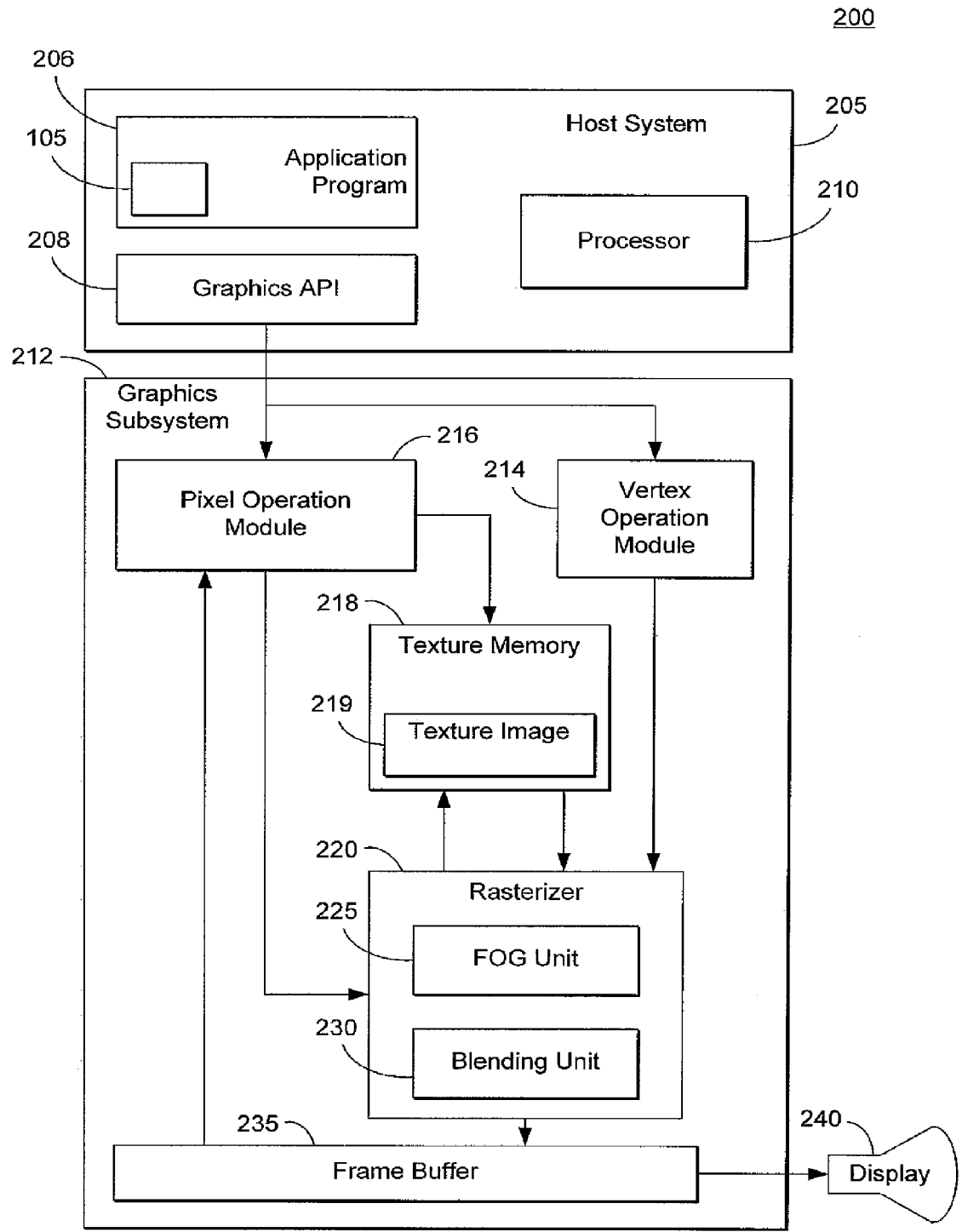
FIG. 2 illustrates an exemplary host and graphics subsystem.

FIG. 2 illustrates an example graphics system 200. Graphics system 200 comprises a host system 205, a graphics subsystem 212, and a display 240. Host system 205 is equipped with an application program 206, a hardware interface or graphics API 208, and a processor 210. Application program 206 can be any program requiring the rendering of a computer image or scene. The computer code of application program 206 is executed by processor 210. Application program 206 accesses the features of graphics subsystem 212 and display 240 through hardware interface or graphics API 208. As shown in FIG. 2, in one example implementation, gaseous phenomena generator module 105 is control logic (e.g., software) that is part of application 206.

Graphics subsystem 212 comprises a vertex operation module 214, a pixel operation module 216, a rasterizer 220, a texture memory 218, and a frame buffer 235. Texture memory 218 can store one or more texture images 219. Rasterizer 220 comprises a fog unit 225 and a blending unit 230.

Fog unit 225 can obtain either linear or non-liner fog color values. Blending unit 230 blends the fog color values and/or pixel values to produce a single pixel. The output of blending unit 230 is stored in frame buffer 235. Display 240 can be used to display images or scenes stored in frame buffer 235.

Figure 3:
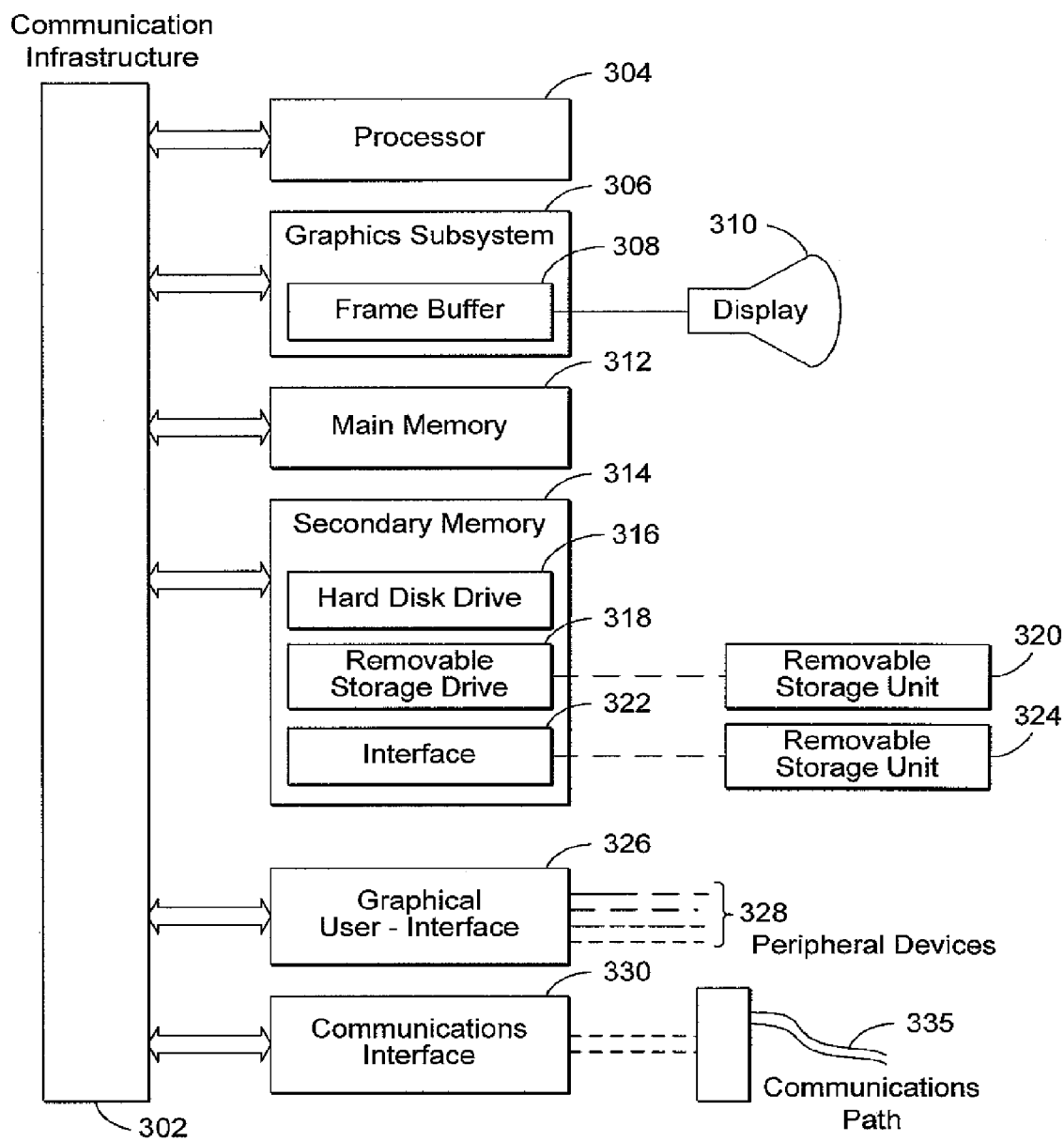
FIG. 3 illustrates an example of a computer system.

Referring to FIG. 3, an example of a computer system 300 is shown. Computer system 300 can be used to implement a computer program product. Computer system 300 represents any single or multi-processor computer. Singlethreaded and multi-threaded computers can be used. Unified or distributed memory systems can be used.

Computer system 300 includes one or more processors, such as a processor 304, and one or more graphics subsystems, such as a graphics subsystem 306. One or more processors 304 and one or more graphics subsystems 306 can execute software and implement all or part of the features described herein. Graphics subsystem 306 can be implemented, for example, on a single chip as a part of processor 304, or it can be implemented on one or more separate chips located on a graphics board. Each processor 304 is connected to a communication infrastructure 302 (e.g., a communications bus, cross-bar, or network).

Computer system 300 also includes a main memory 312, preferably random access memory (RAM), and can also include a secondary memory 314. Secondary memory 314 can include, for example, a hard disk drive 316 and/or a removable storage drive 318, representing a floppy disk drive, a magnetic tape drive, an optical disk drive, et cetera. The removable storage drive 318 reads from and/or writes to a removable storage unit 320 in a well-known manner. Removable storage unit 320 represents a floppy disk, magnetic tape, optical disk, etc., which is read by and written to by removable storage drive 318. As will be appreciated, the removable storage unit 320 includes a computer usable storage medium having stored therein computer software and/or data.

In alternative exemplary implementations, secondary memory 314 may include other similar means for allowing computer programs or other instructions to be loaded into computer system 300. Such means can include, for example, a removable storage unit 324 and an interface 322. Examples can include a program cartridge and cartridge interface (such as that found in video game devices), a removable memory chip (such as an EPROM, or PROM) and associated socket, and other removable storage units 324 and interfaces 322 which allow software and data to be transferred from the removable storage unit 324 to computer system 300.

In one exemplary illustration, computer system 300 includes a frame buffer 308 and a display 310. Frame buffer 308 is in electrical communication with graphics subsystem 306. Images stored in frame buffer 308 can be viewed using display 310.

Computer system 300 can also include a communications interface 330. Communications interface 330 allows software and data to be transferred between computer system 300 and external devices via a communications path 335. Examples of communications interface 330 can include a modem, a network interface (such as Ethernet card), a communications port, etc. Software and data transferred via communications interface 330 are in the form of signals which can be electronic, electromagnetic, optical or other signals capable of being received by communications interface 330, via communications path 335. Note that communications interface 330 provides a means by which computer system 300 can interface to a network such as the Internet.

Computer system 300 can include one or more peripheral devices 328, which are coupled to communications infrastructure 302 by graphical user-interface 326. Example peripheral devices 328, which can from a part of computer system 300, include, for example, a keyboard, a pointing device (e.g., a mouse), a joy stick, a game pad as well as other related peripheral devices 328.

System 300 can be implemented using software running (that is, executing) in an environment similar to that described above with respect to FIG. 3. As used herein, the term "computer program product" is used to generally refer to removable storage unit 320, a hard disk installed in hard disk drive 316, or a carrier wave or other signal carrying software over a communication path 335 (wireless link or cable) to communication interface 330. A computer useable medium can include magnetic media, optical media, or other recordable media, or media that transmits a carrier wave. These computer program products are means for providing software to computer system 300.

Computer programs (also called computer control logic) are stored in main memory 312 and/or secondary memory 314. Computer programs can also be received via communications interface 330. Such computer programs, when executed, enable the computer system 300 to perform various features discussed herein. In particular, the computer programs, when executed, enable the processor 304 to perform the features rendering fog and other related gaseous phenomena. Accordingly, such computer programs represent controllers of the computer system 300.

In a software implementation, the software may be stored in a computer program product and loaded into computer system 300 using removable storage drive 318, hard drive 316, or communications interface 330. Alternatively, the computer program product may be downloaded to computer system 300 over communications path 335. The control logic (software), when executed by the one or more processors 304, causes the processor(s) 304 to perform the functions as described herein.

Computer system 300 can also be implemented primarily in firmware and/or hardware using, for example, hardware components such as application specific integrated circuits (ASICs) or a hardware state machine so as to perform the functions described herein.

Figure 4:
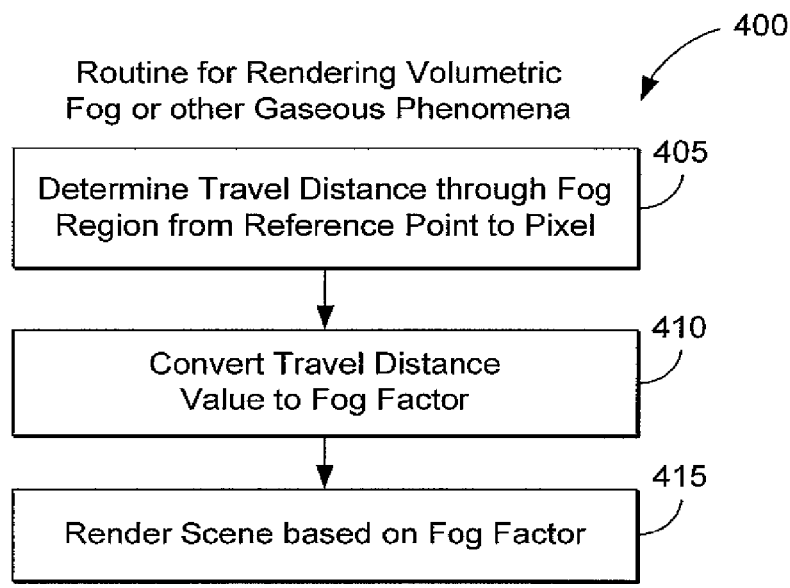
FIG. 4 is a flowchart illustrating a routine for rendering volumetric fog or other gaseous phenomena.

FIG. 4 is a flowchart of a routine 400 (steps 405–415) for rendering volumetric fog objects or other gaseous phenomena.

To begin, in step 405, the distance traveled through fog (or any gaseous phenomena) from a reference point to an object pixel is determined. If the density of the fog object is constant in the areas where the fog is present, the attenuation factor for a given pixel depends only on the distance a ray coming from a reference point travels through the fog object. For example in one implementation the reference point is determined based upon the eye or viewpoint of a user of application program 110. Step 405 will now be described in greater detail with reference to FIGS. 5–9.

Figure 5:
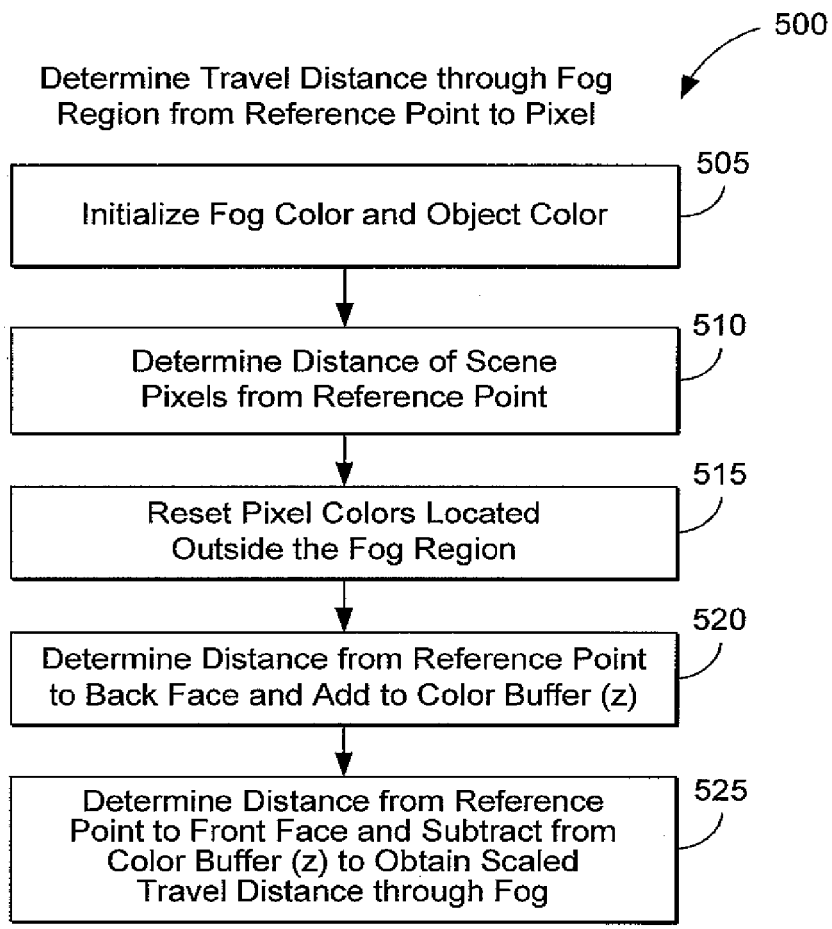
FIG. 5 is a flowchart illustrating a routine for determining the distance traveled through fog from a reference point to a pixel.

FIG. 5 describes a routine 500 for determining the distance traveled through a fog object from a reference point to a pixel. In step 505 a fog color value and a pixel color are initialized. A OpenGL linear fog is used. In this case, the fog attenuation factor is linearly increasing from 0 at a user-defined start distance to 1 at an end distance. Thus, if the fog color value is set to (1,1,1) and the pixel color to (0,0,0) the resulting pixel color directly corresponds to the distance from the reference point minus the start distance.

Figures 6, 7:
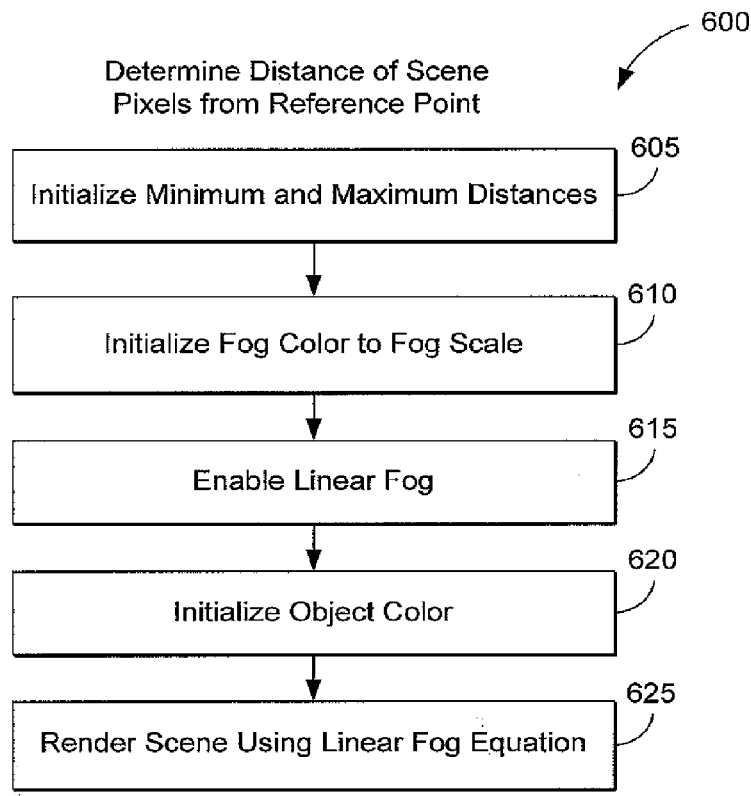
FIG. 6 is a flowchart diagram showing further detail of a routine for determining the distance traveled through fog from a reference point to a pixel.
FIG. 7 is an illustration of a linear fog equation used to render a scene including fog or other gaseous phenomena.

In step 510, the distance from the reference point to the pixel is determined according to routine 600 described now with reference to FIG. 6.

In step 605, a minimum distance value and a maximum distance value are initialized. The minimum distance value and the maximum distance value are set that all the fog objects are inside the bounds set by these two values.

In step 610, the fog color is set to a fog scale value. The fog scale value can be defined by a user or set to a default. In one implementation, the fog scale value and, correspondingly, the fog color is set to 0.5.

In step 615, linear fog is enabled. Next, in step 620, the object color values are initialized. The color selected is black. Finally, in step 625, the scene is rendered using the linear fog equation shown in FIG. 7.

In applying the linear fog equation, a fog attenuation factor (f) value is determined by subtracting the maximum distance value from the pixel distance value. This result is divided by the maximum distance value minus the minimum distance value. The fog factor modifies the pixel color by multiplying the attenuation factor (f) and the pixel color (absent fog), adding the result of one minus the attenuation factor (f) and multiplying the result by the fog color (Equation 2). The pixel color is set to 0 and fog color is set to fog scale. Equation 2 can then be simplified into equation 3. The scene is then rendered using equation 2 from FIG. 7. The color value is obtained by subtracting the pixel distance value minus the minimum distance value, dividing by the maximum distance minus the minimum distance and multiplying the result times the fog scale value. The result of the maximum distance minus the minimum distance is equal to |M1,Z1|. Using this approach, the graphics hardware does the computation automatically, given specific values of minimum and maximum distance, fog color (fog scale), and pixel color (0).

Upon the completion of routine 600, the pixel color values stored in the frame buffer represents the distance traveled from a reference point to each pixel in the scene. Since only the pixels inside the fog objects are impacted by the presence of fog objects, these pixels need to be identified and the color of other pixels outside of the fog objects needs to be reset. Thus processing continues with routine 500, step 515.

Figure 8:
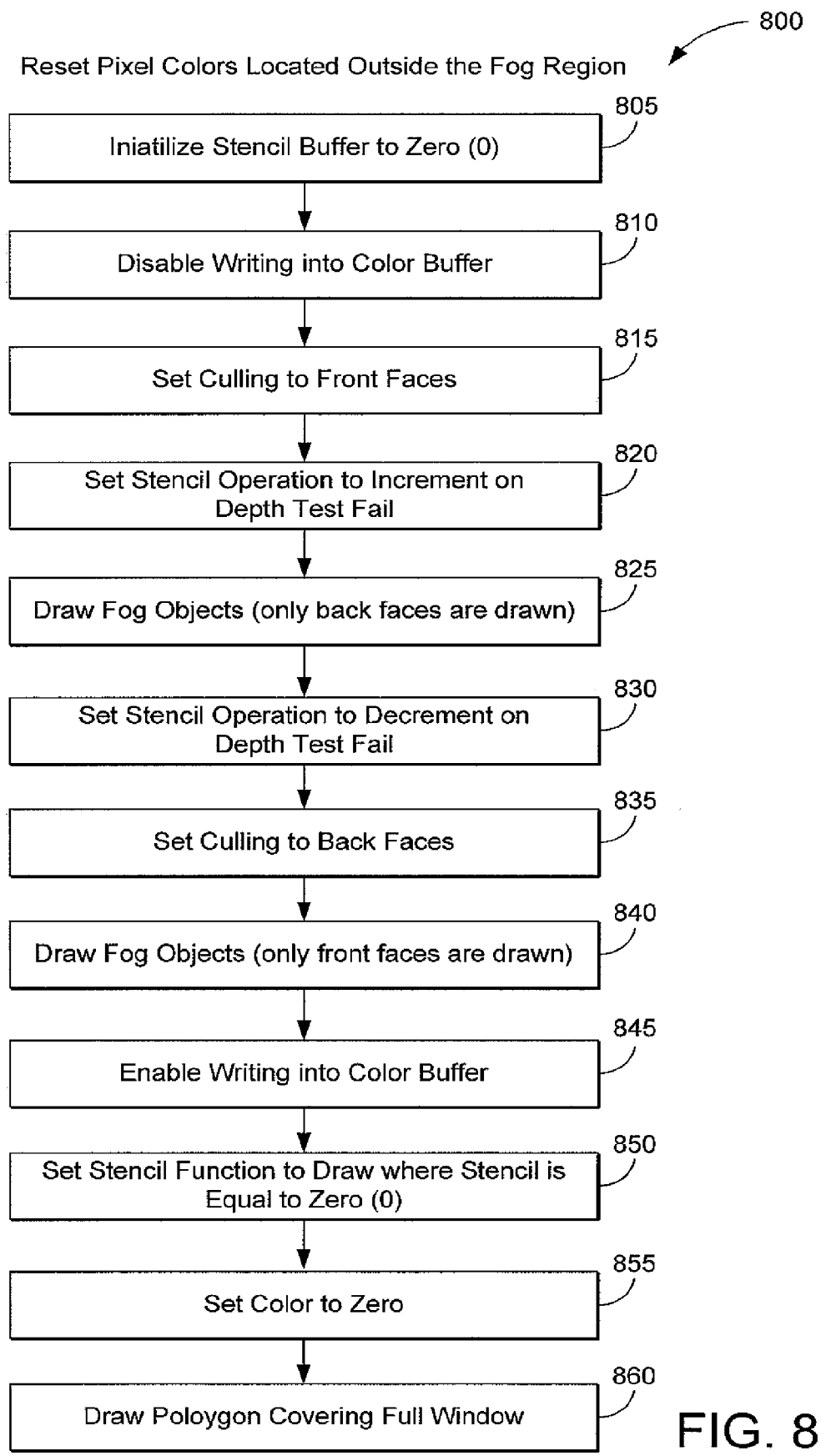
FIG. 8 is a flowchart diagram describing an OPENGL implementation of a routine for resetting pixel colors located outside of a fog region.
Figure 9:
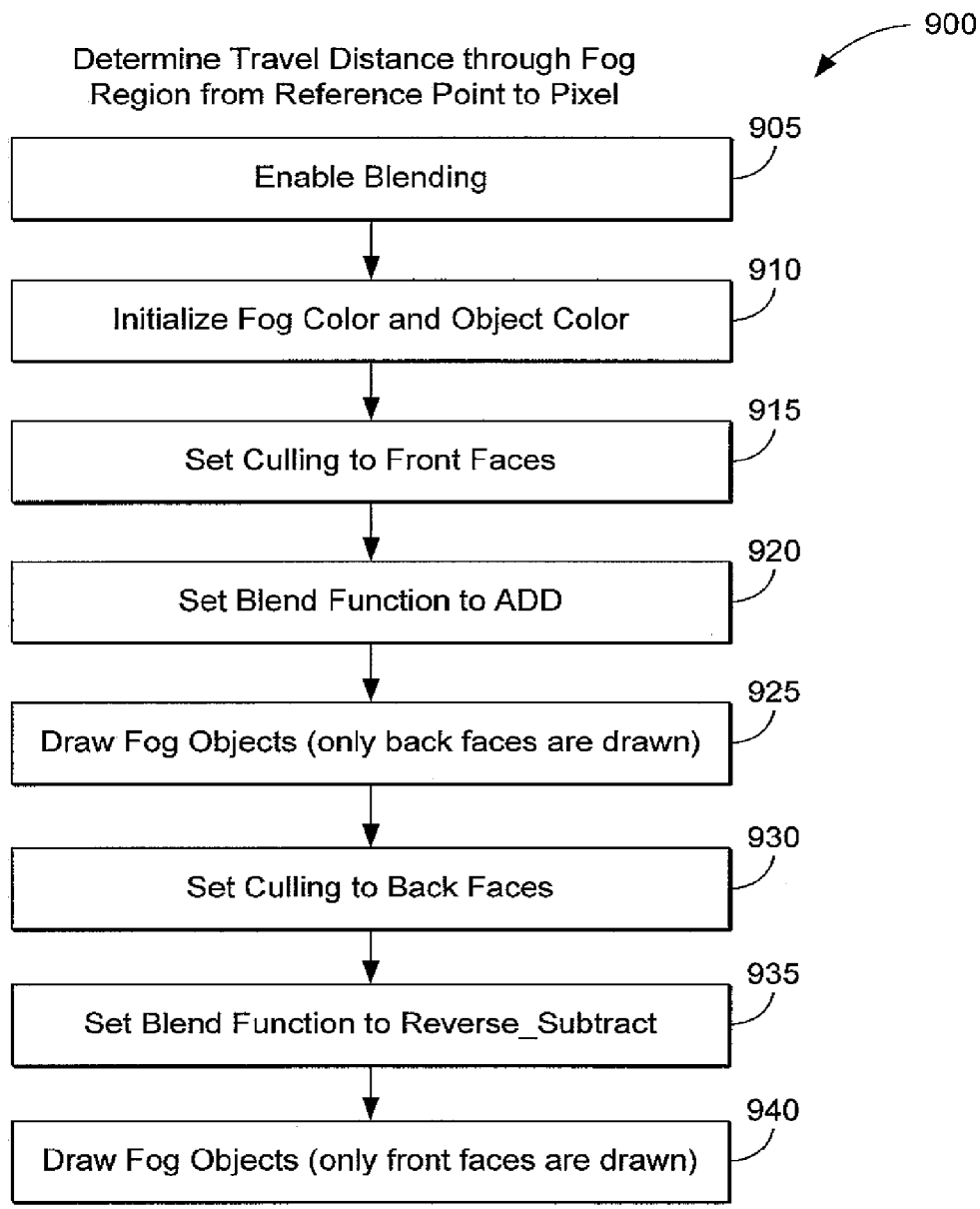
FIG. 9 is a flowchart diagram describing an OPENGL implementation of a routine for determining travel distance through fog from a reference point to a pixel.

In step 515, the pixel color values of those pixels located outside the fog objects are reset. To do so, the fog objects are rendered and the number of front and back faces behind each pixel are counted. In counting the front and back faces, one (1) is added to the stencil buffer for each back face and one (1) is subtracted for each front face that fails the depth test. Where the number of front and back faces are equal, the pixel color value is reset to zero. FIG. 8 illustrates an OpenGL implementation of step 515.

In step 805, the stencil buffer is initialized to zero (0). In step 810, writing into the color buffer is disabled. In step 815, the front faces are culled using the OpenGL cull mechanism. In step 820, the stencil operation is set to increment on depth test fail. In step 825, the fog objects are drawn. Because culling is set to front faces, only back faces will be drawn. In step 830, the stencil operation is set to decrement on depth test fail. In step 835, the back faces are culled using the OpenGL cull mechanism. In step 840, the fog objects are again drawn. Due to back face culling, only the front faces are drawn.

Next, in step 845, writing into the color buffer is enabled. As a result of the adding and subtracting performed in steps 820 and 830, stencil will be equal to zero in those cases where the number of back faces is equal to the number of front faces. In step 850, the stencil function is set to draw where stencil is equal to zero (0). Next, in step 855 color is set to zero (0). Finally, in step 860 a full window black polygon is drawn such that drawing is allowed to the color buffer for only pixels with stencil value equal to 0. This has the effect of resetting the color of those pixels located outside the fog objects. Now the color channels are set to the distance from the eye (minus the start distance), but only for pixels that are inside a volume object. In order to enable use of the cull face mechanism, the fog boundary is specified so that front faces can be easily determined by the order of vertices. Also, fog objects have to be fully closed for routine 800 to work. Further description will be continued with reference again to FIG. 5.

In step 520, the distance from the reference point to the back faces is determined and added to the color buffer. An OpenGL implementation of this step will now be explained with reference to FIG. 9.

Using the OpenGL cull mechanism, the a method of implementing routine 900 is to set culling to cull out all front faces, render all fog objects, then set culling to remove all back faces and render all fog objects again. If there are several back faces overlapping a pixel, the sum of all distances, converted to a color value, may overflow one (1). In this case the result is clamped to one (1) and the result after subtracting is incorrect.

To prevent overflows, it is desirable to render each fog object separately, adding only its "depth" to the color buffer. Another option is to reduce the initial color for the linear fog. If the color is set to (r,r,r), where r=any value between zero (0) and one (1), instead of pure white (1,1,1) the resulting distances are scaled by the factor r, also referred to as fog scale. The lower the value the less precision available for the distance, but the likelihood of overflows is reduced. This approach works well for complex fog shapes that cannot be easily divided into separate convex pieces. Routine 900 will now be described in detail. In step 910, fog color and pixel color are initialized. In step 915, the OpenGL culling mechanism is used to cull front faces.

In step 920, the blend function is set to ADD. In step 925 the fog objects are drawn. Because front face culling is used, only the back faces are drawn. Upon completion of step 925, the sum of the distances from the reference point to the back faces will be stored in the color buffer. Processing then returns to routine 500.

In step 525, the distances from the reference point to the front faces are determined and subtracted from the color buffer. An OpenGL implementation of this step will now be explained with reference to FIG. 9.

In step 930, the OpenGL culling mechanism is used to cull back faces. In step 935, the blend function is set to reverse_subtract. Finally, in step 940, the fog objects are again drawn. Here, only the front faces will be drawn since back face culling is enabled. Updates to the depth buffer are disabled during steps 905–940.

Upon completion of routine 900 (steps 905–940), the color buffer contains values that correspond to the distance a ray coming from the reference point to each pixel traveled through fog objects. Processing then returns to routine 400.

In step 410, the travel distance (z) is converted into an attenuation factor (f) that can be used to blend the color of the fog with the scene color. Assuming the fog density (p) in all fog objects is the same, the attenuation factor f is $f=e^{-p \cdot z}$. The function $1-e^{-x}$ for $x \in (0, R)$ where R is a value for which the function is almost 1, can be pre-computed into a pixel map. Next, use pixel copy of the window area onto itself, apply a pixel transfer scale S to scale the distances z into the range $(0, R)$ and apply a pixel map to compute the exponential. The scale S can be computed as $S=p \cdot (z_e-z_s) \cdot z/(R \cdot r)$, where $z_s$ and $z_e$ is the start and end distance of the linear fog and r is the fog color scale factor. As a result, each travel distance (z) gets converted into a value one minus attenuation factor.

The pixel map can store an arbitrary function, for example the exp2 function supported by OpenGL ($1-f=1-e^{-p \cdot p \cdot z \cdot z}$). Unfortunately, on most systems a full screen pixel copy is so slow that the frame rate can drop well below 10 fps. The solution is to use a smaller window size (e.g., 640×480) or a system with several graphics pipes.

To avoid the use of pixel maps, linear dependency of the attenuation factor f on the distance, as in the case of linear fog in OpenGL, is necessary. If the travel distance z is multiplied by a value $s=(z_e-z_s)/(D\cdot r)$, where D is the distance for which the attenuation factor becomes 0, the value 1−f is obtained.

Multiplication by a constant $s=2^n-d$ is performed in several passes, n times multiplying by two (2) and once multiplying by d (a value between 1 and 2). If s is below one (1), only one pass is required. The multiplication is done by drawing a full-window polygon of color one (1) (or d/2) and blend factors set to DST_COLOR and SRC_ALPHA.

Figure 10:
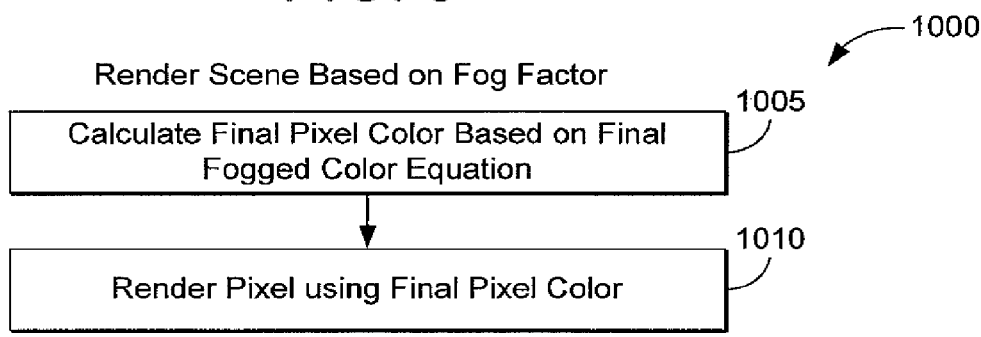
FIG. 10 is a flowchart diagram of a routine for rendering a scene based on a final fog factor.

Once the attenuation factors for each pixel have been determined, the scene is ready to be rendered according to step 415. FIG. 10 provides a detailed description of the step 415 for rendering the scene based on the attenuation factor.

Figures 11, 12:
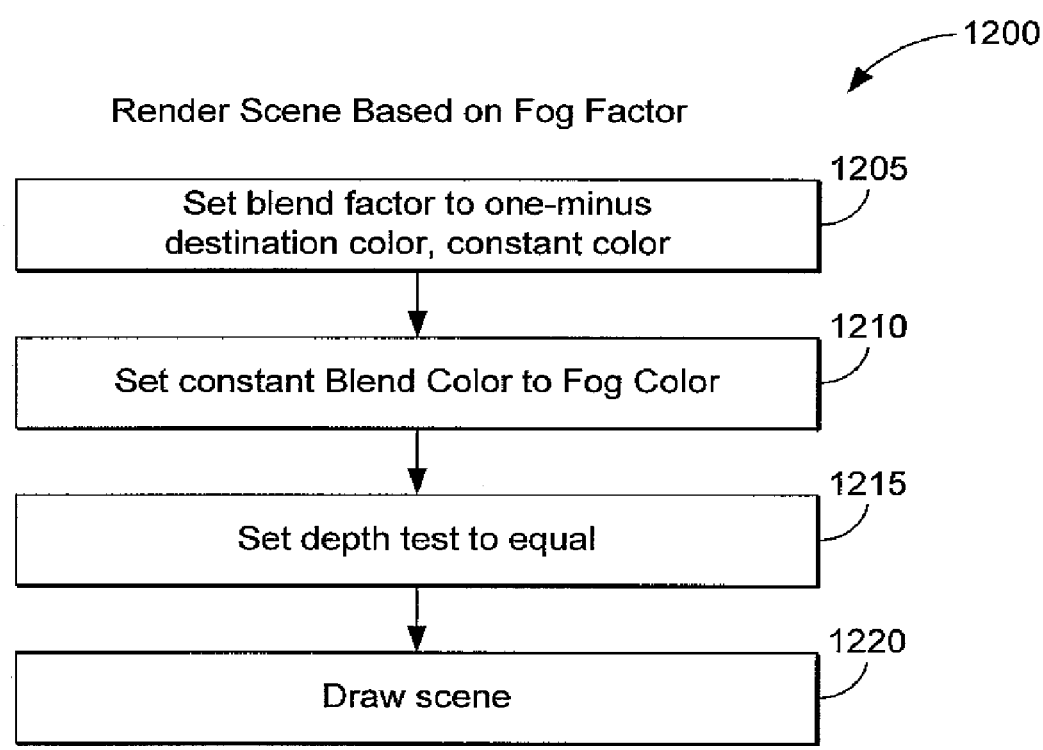
FIG. 11 is an illustration of an equation used to determine a final fog factor.
FIG. 12 is a flowchart diagram of a routine for rendering a scene including fog and other gaseous phenomena based on a final fog factor.

In order to render the scene with the appropriate visual realism, a final fogged color is determined in step 1005. Here, the equation shown in FIG. 11 is applied. The final fogged color equation blends the incoming color C (pixel color absent fog), with the color of the fog Cf (defined as a constant blend color) and uses the attenuation factors (fog factors) stored in the color buffer. Next, in step 1010, the scene is rendered using the final fogged color. Step 1010 is described in further detail with reference to FIG. 12.

In step 1205, a blend factor is set. The blend factors used are ONE_MINUS_DST_COLOR, and CONSTANT_COLOR. In step 1210, a constant blend color is set equal to the color of the fog. If the OpenGL blend-color extension is not available the fog color is white. It is necessary to ensure that only pixels that are visible are drawn. Thus in step 1215, the depth test is set to EQUAL and in step 1220, stencil test is used to draw each pixel only once.

Overall, routine 400 draws the scene twice and the fog objects four times (although each time only half the faces are drawn). In addition, there is one fill-window polygon drawn in step 860 and several more or one pixel copy in step 410. This still allows acceptable frame rates in many applications.

FIGS. 13A–F illustrate an OpenGL implementation of steps 405–415.

Figure 13A:
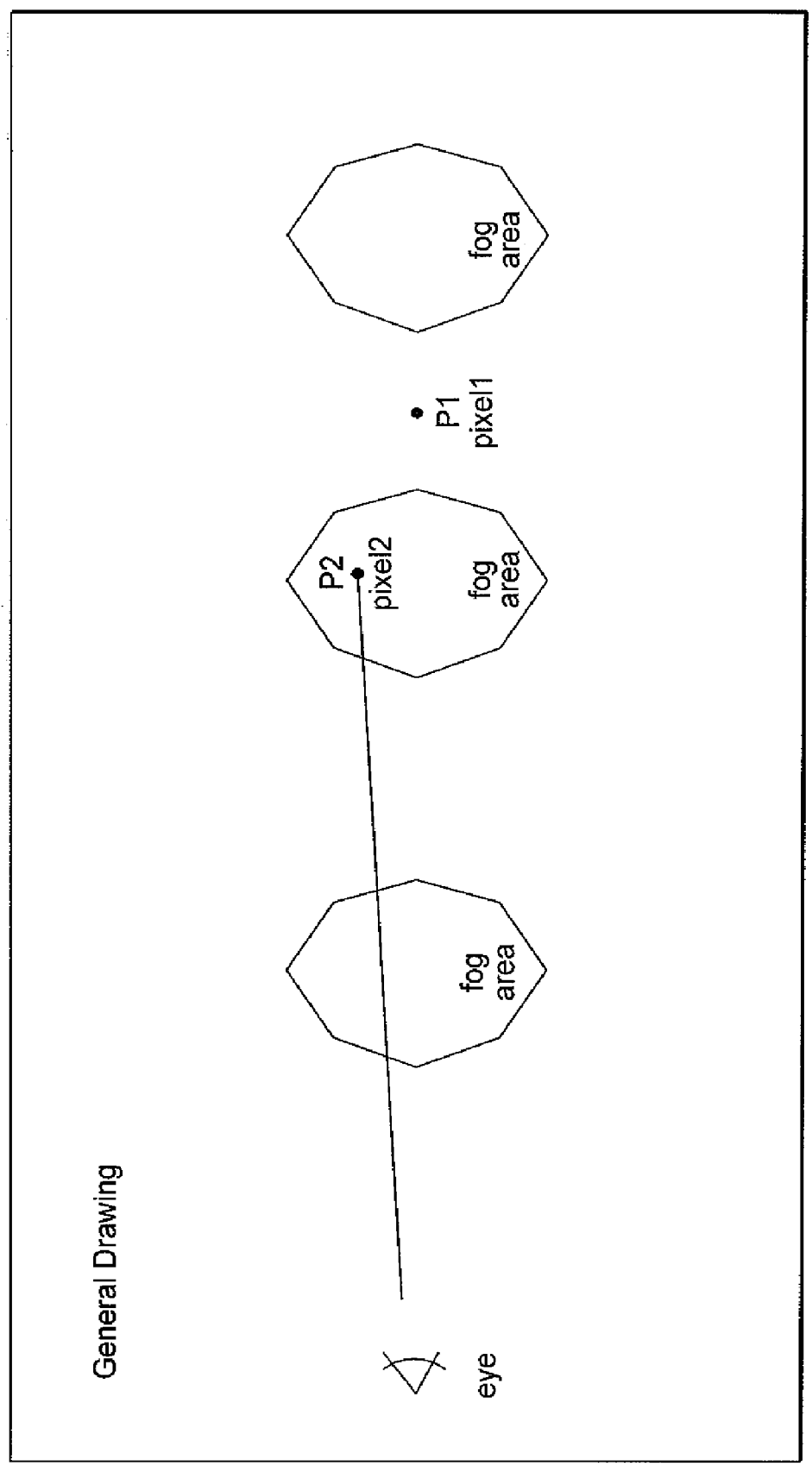
FIG. 13A is an illustration of a routine for rendering volumetric fog or other gaseous phenomena.

In FIG. 13A a general rendering of a scene including three fog areas is presented. From the illustration, it is apparent that using the eye of the viewer as the reference point, it is necessary to look through at least one fog object to see pixel two (P2) and two fog objects to see pixel one(P1).

Figure 13B:
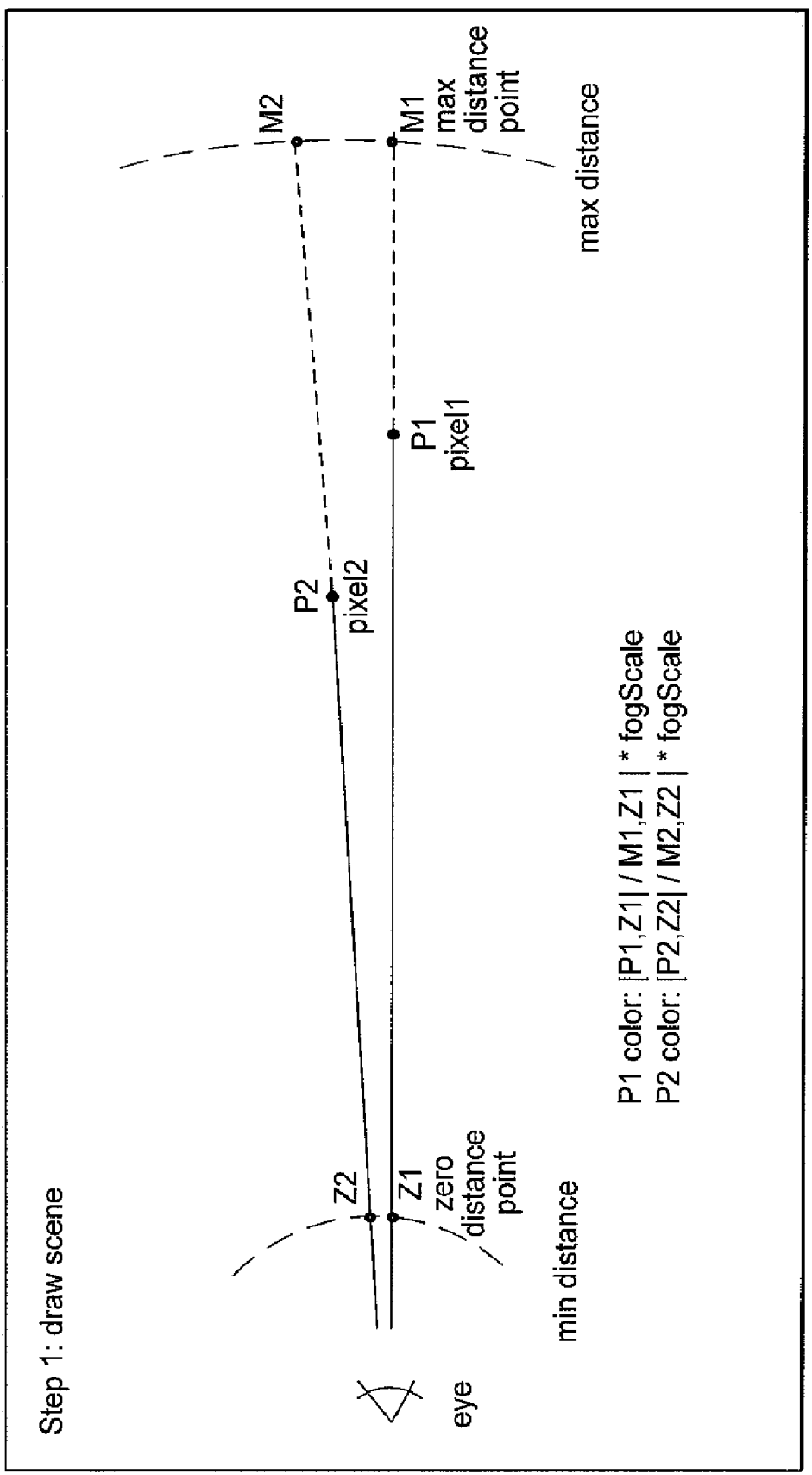
FIG. 13B is an illustration of a routine for determining the distance from a reference point to a pixel.

In FIG. 13B, the scene is rendered using linear fog. The start distances z1, z2, and the end distances m1, m2, are set so that all volume objects are inside their bounds.

Figure 13C:
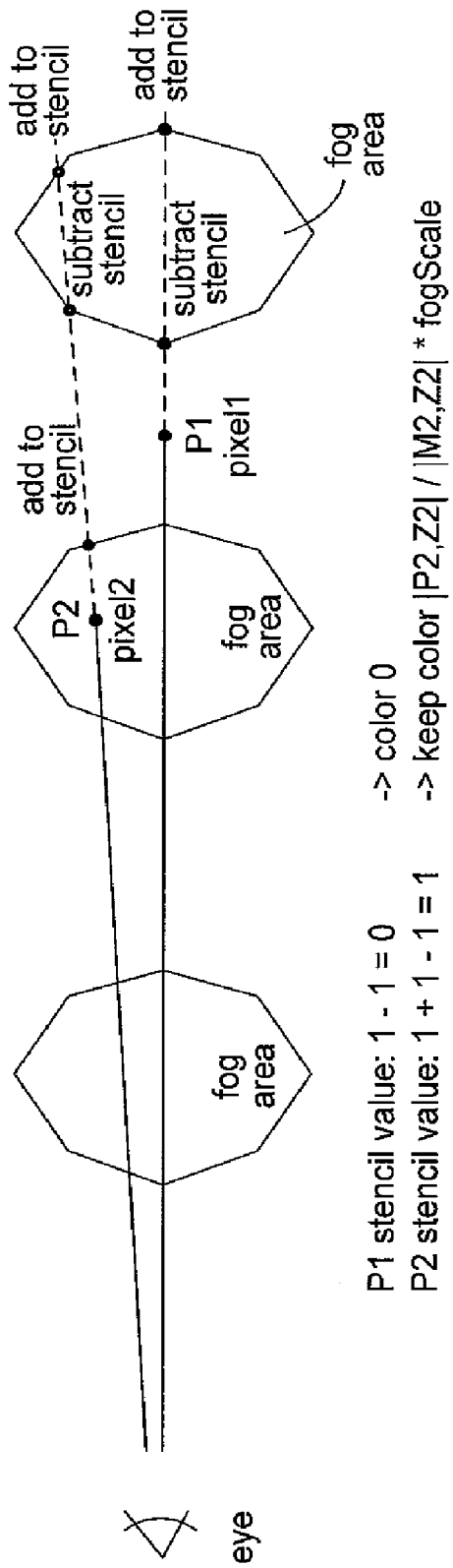
FIG. 13C is an illustration of resetting pixel colors located outside of a fog region.

In FIG. 13C, the volume objects are rendered and the number of front and back faces behind each pixel is counted. Next, those pixels, for which the number of back faces is equal to the number of front faces, are set to (0,0,0). Now the color channels are set to the distance from the eye (minus the start distance), but only for pixels that are inside a volume object.

Figure 13D:
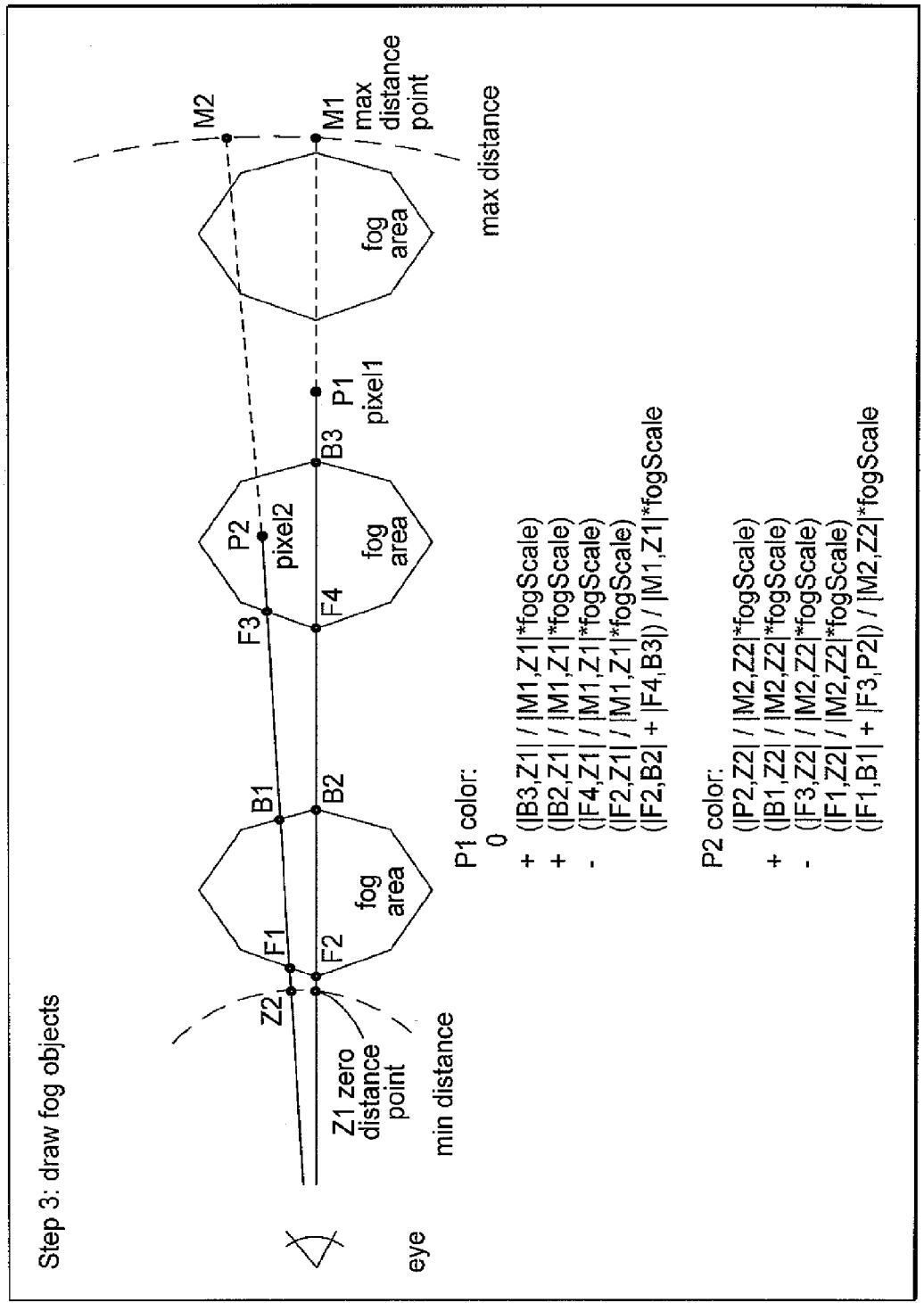
FIG. 13D is an illustration showing further detail of a routine for determining the distance traveled through fog from a reference point to a pixel.

In FIG. 13D, the volume objects are drawn using linear fog by adding the distances for the back faces and subtracting distances for the front faces. Updates in depth buffer are still disabled. After this step the color buffer contains values that correspond to the distance a ray coming from the eye to each pixel traveled through volume objects.

Figure 13E:
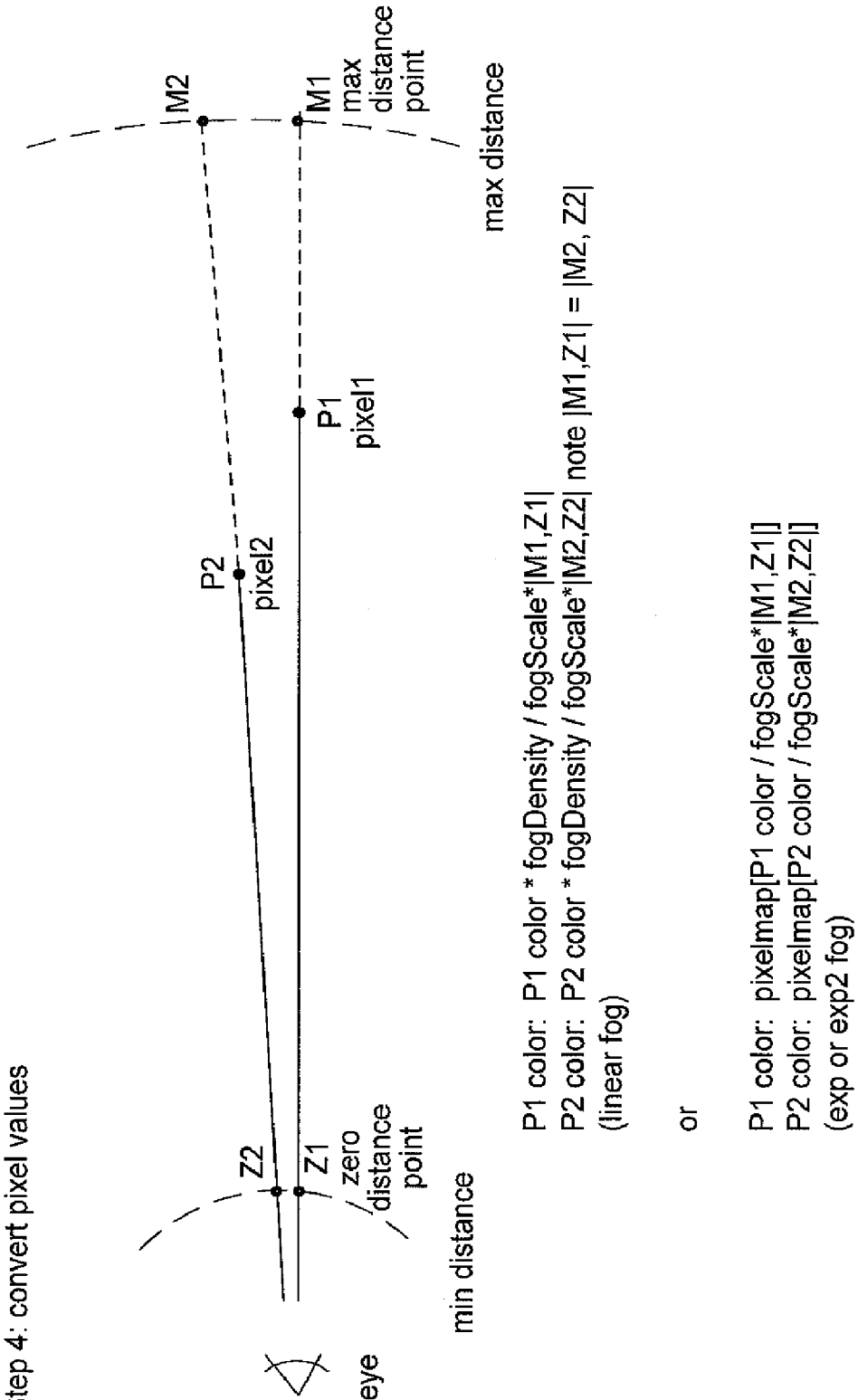
FIG. 13E is an illustration of a conversion routine for determining a fog factor based upon distance traveled through fog from a reference point to a pixel.

In FIG. 13E the travel distance z is converted into an attenuation factor (f) that is used to blend the color of the gas with the scene color.

Figure 13F:
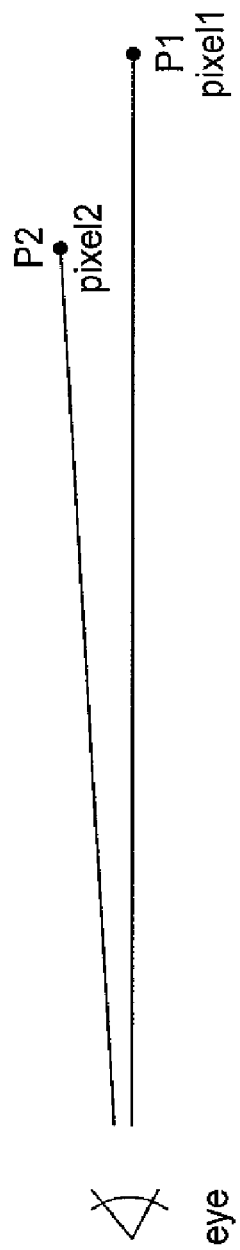
FIG. 13F is an illustration of a routine for rendering a scene including fog and other gaseous phenomena based on a final fog factor.

Finally, in FIG. 13F, the attenuation factors for each pixel are used to render the scene with correct materials and blend the incoming color C, with the color of the gas Cf (defined as a constant blend color), using the attenuation factors stored in the color buffer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A system for rendering a scene that includes gaseous phenomena, the system comprising:
    means for determining a travel distance value through at least one fog object from a reference point to a pixel;
    means for converting the travel distance value to a fog factor value; and
    means for determining a pixel color value for the pixel based on the fog factor value, whereby the scene can be rendered using the determined pixel color,
    wherein the fog object is bounded by a front face and a back face, and
    wherein the means for determining a travel distance value comprises:
        means for initializing the pixel color value;
        means for determining a back distance value from the reference point to the back face of the fog object and adding the back distance value to a color buffer value; and
        means for determining a front distance value from the reference point to the front face of the fog object and subtracting the front distance value from the color buffer value, wherein the final color buffer value represents a scaled travel distance through the fog object.

2. The system as recited in claim 1 wherein the front distance value and the back distance value are determined using a linear equation.

3. The system as recited in claim 2 wherein the travel distance is converted to the fog factor by solving a linear equation.

4. The system as recited in claim 2 wherein the travel distance is converted to the fog factor by solving an exponential equation.

5. The system of claim 2 wherein the travel distance is converted to the fog factor by solving an exponential-squared equation.

6. A system comprising:
    one or more processors; and
    a computer usable storage medium having stored therein instructions configured to render images including gaseous phenomena having atmospheric effects by causing the one or more processors to:
        determine a travel distance value through at least one fog object from a reference point to a pixel, wherein the fog object is bounded by a front face and a back face;
        convert the travel distance value to a fog factor value; and
        determine a pixel color value for the pixel based on the fog factor value, whereby the images can be rendered using the determined pixel color, wherein the instructions configured to render images having atmospheric effects by causing the one or more processors to determine a travel distance value comprise instructions configured to cause the one or more processors to:

initialize the pixel color value;

determine a back distance value from the reference point to the back face of the fog object and adding the back distance value to a color buffer value; and determine a front distance value from the reference point to the front face of the fog object and subtracting the front distance value from the color buffer value, wherein the final color buffer value represents a scaled travel distance through the fog object.

7. The system as recited in claim 6 wherein the front distance value and the back distance value are determined using a linear equation.

8. The system as recited in claim 6 wherein the travel distance is converted to the fog factor by solving a linear equation.

9. The system as recited in claim 6 wherein the travel distance is converted to the fog factor by solving an exponential equation.

10. The system as recited in claim 6 wherein the travel distance is converted to the fog factor by solving an exponential-squared equation.

11. A system configured to render a scene including gaseous phenomena having atmospheric comprising:

a gaseous phenomena generator, configured to:

determine a travel distance value through at least one fog object from a reference point to a pixel, wherein the fog object is bounded by a front face and a back face; and convert the travel distance value to a fog factor value; and a blending unit, configured to:

determine a pixel color value for the pixel based on the fog factor value, whereby the scene can be rendered using the determined pixel color, wherein determining a travel distance value comprises:

initializing the pixel color value;

determining a back distance value from the reference point to the back face of the fog object and adding the back distance value to a color buffer value; and determining a front distance value from the reference point to the front face of the fog object and subtracting the front distance value from the color buffer value, wherein the final color buffer value represents a scaled travel distance through the fog object.

12. The system as recited in claim 11 wherein the front distance value and the back distance value are determined using a linear equation.

13. The system as recited in claim 11 wherein the travel distance is converted to the fog factor by solving a linear equation.

14. The system as recited in claim 11 wherein the travel distance is convened to the fog factor by solving an exponential equation.

15. The system as recited in claim 11 wherein the travel distance is converted to the fog factor by solving an exponential-squared equation.

* * * * *